United States Patent
Igeta et al.

(10) Patent No.: US 12,360,414 B2
(45) Date of Patent: Jul. 15, 2025

(54) LIQUID CRYSTAL PANEL, LIQUID CRYSTAL PANEL APPARATUS, AND IMAGER

(71) Applicant: Japan Display Inc., Tokyo (JP)

(72) Inventors: Koichi Igeta, Tokyo (JP); Kasumi Hase, Tokyo (JP); Yoshiro Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/808,373

(22) Filed: Aug. 19, 2024

(65) Prior Publication Data

US 2025/0068010 A1 Feb. 27, 2025

(30) Foreign Application Priority Data

Aug. 24, 2023 (JP) ................. 2023-136286

(51) Int. Cl.
*G02F 1/1335* (2006.01)
*G02F 1/1339* (2006.01)

(52) U.S. Cl.
CPC .... *G02F 1/133512* (2013.01); *G02F 1/13394* (2013.01)

(58) Field of Classification Search
CPC ........... G02F 1/133512; G02F 1/13394; G02F 1/13396
See application file for complete search history.

(56) References Cited

U.S. PATENT DOCUMENTS

2025/0068008 A1* 2/2025 Hase ............... G02F 1/1334

FOREIGN PATENT DOCUMENTS

| CN | 108957868 A | * | 12/2018 | ........... G02F 1/1333 |
| CN | 109856849 A | * | 6/2019 | |
| CN | 110045533 A | * | 7/2019 | |
| CN | 110928016 A | * | 3/2020 | ........... G02F 1/1333 |
| JP | 2022-167026 A | | 11/2022 | |

* cited by examiner

*Primary Examiner* — Mariceli Santiago
(74) *Attorney, Agent, or Firm* — Michael Best & Friedrich LLP

(57) ABSTRACT

A liquid crystal panel has a hole allowing light to pass through or to be shielded, and suppresses an influence on the light passing through the hole. A liquid crystal panel includes: a first substrate having a flat plate shape; a second substrate arranged to face the first substrate; a light shielding film spreading along an inner surface of the second substrate and having the hole formed therein; a plurality of spacers arranged on an outer side of a region between the substrates, the region corresponding to the hole; and a liquid crystal sandwiched between the first substrate and the second substrate. The second substrate is held such that a distance from the first substrate becomes larger as coming closer to the hole, and the portion corresponding to the hole has a shape protruding in a direction extending from the first substrate to the second substrate.

9 Claims, 9 Drawing Sheets

LIQUID CRYSTAL PANEL, LIQUID CRYSTAL PANEL APPARATUS, AND IMAGER

CROSS-REFERENCE TO RELATED APPLICATION

The present application claims priority to Japanese Patent Application No. 2023-136286 filed on Aug. 24, 2023, the disclosure of which is incorporated herein by reference.

TECHNICAL FIELD OF THE INVENTION

The present invention relates to a liquid crystal panel, a liquid crystal panel apparatus, and an imager.

BACKGROUND OF THE INVENTION

Liquid crystal panels allowing light to pass through and to be shielded have been known. Such a liquid crystal panel generally has a structure in which a liquid crystal layer is sandwiched between two glass substrates including a transparent electrode, as described in Japanese Patent Application Laid-Open Publication No. 2022-167026 (Patent Document 1).

SUMMARY OF THE INVENTION

In the liquid crystal panel, by arranging a light shielding film having a hole formed therein, along an inner surface of one of the substrates to control a voltage between the electrodes, a region corresponding to the hole can be set to either a light passage state or a light shielding state.

However, in the liquid crystal panel simply provided with the light shielding film having the hole formed therein, light that attempts to pass through the hole may be variously affected.

Under such circumstances, it is desirable to provide a technique for a liquid crystal panel having the hole that allows the light to pass through or to be shielded and being capable of suppressing the influence on the light that attempts to pass through the hole.

According to an embodiment, in a liquid crystal panel including: a first substrate having a flat plate shape and allowing light to pass through; a second substrate arranged to face the first substrate and allowing light to pass through; a light shielding film spreading along an inner surface of the second substrate between the first substrate and the second substrate and having a hole formed therein; a plurality of spacers arranged between the first substrate and the second substrate to be spaced apart from one another in a planar direction of the first substrate; and a liquid crystal sandwiched between the first substrate and the second substrate, the plurality of spacers are arranged on an outer side of a region corresponding to the hole, the second substrate is held such that a substrate-to-substrate distance between the first substrate and the second substrate in a peripheral region of the outer side of the region corresponding to the hole becomes larger as coming closer to the hole, and the region corresponding to the hole has a shape protruding in a direction extending from the first substrate to the second substrate.

According to an embodiment, in a liquid crystal panel apparatus including: a first substrate having a flat plate shape and allowing light to pass through; a second substrate arranged to face the first substrate and allowing light to pass through; a light shielding film spreading along an inner surface of the second substrate between the first substrate and the second substrate and having an hole formed therein; a plurality of spacers arranged between the first substrate and the second substrate to be spaced apart from one another in a planar direction of the first substrate; a liquid crystal sandwiched between the first substrate and the second substrate; and a controller controlling a voltage applied to the liquid crystal, the plurality of spacers are arranged on an outer side of a region corresponding to the hole, the second substrate is held such that a substrate-to-substrate distance between the first substrate and the second substrate in a peripheral region of the outer side of the region corresponding to the hole becomes larger as coming closer to the hole, the region corresponding to the hole has a shape protruding in a direction extending from the first substrate to the second substrate, and the controller sets the region corresponding to the hole to either a light passage state or a light shielding state by controlling the voltage.

According to an embodiment, an imager includes: an optical system; the liquid crystal panel apparatus; and an imaging element receiving light that has passed through the optical system and the hole of the liquid crystal panel apparatus.

BRIEF DESCRIPTIONS OF THE DRAWINGS

DESCRIPTIONS OF THE PREFERRED EMBODIMENTS

Issues Found by Present Inventors

Before describing embodiments of the present invention, one of specific issues in a liquid crystal panel found by the present inventors will be described.

Regarding liquid crystal panels, the present inventors have focused on a liquid crystal panel having a hole that allows light to pass through or to be shielded. This is because the liquid crystal panel having such a function can be used as a shutter or a diaphragm of the imager by being arranged in front of and/or behind an optical system of the imager. The liquid crystal panel has, for example, the following configuration.

The liquid crystal panel includes: a first substrate having a flat plate shape and allowing light to pass through; a second substrate arranged to face the first substrate and allowing light to pass through; and a liquid crystal sandwiched between the first substrate and the second substrate. The liquid crystal panel further includes: a plurality of spacers arranged between the first substrate and the second substrate; and a light shielding film spreading along an inner side of the second substrate and having a hole formed therein. A region of the liquid crystal panel, the region corresponding to a hole of the light shielding film, is set to either a light passage state or a light shielding state by control for a voltage applied to the liquid crystal. If the region of the liquid crystal panel, the region corresponding to the hole, is set to the light passage state, the light passes through the region. On the other hand, if the region of the liquid crystal panel, the region corresponding to the hole, is set to the light shielding state, the light is not allowed to pass through the region.

Incidentally, when the spacer is arranged in the region corresponding to the hole between the substrates of the liquid crystal panel, light that passes through the hole is undesirably affected when being reflected, scattered, refracted, or absorbed or when disturbing an orientation of the liquid crystal due to the spacers. From the viewpoint, it is preferable not to arrange any spacer in the region corresponding to the hole between the substrates of the liquid crystal panel.

However, it has been found that another failure may be caused if no spacer is arranged in the region corresponding to the hole between the substrates of the liquid crystal panel. This point will be described below.

Figure 10A:
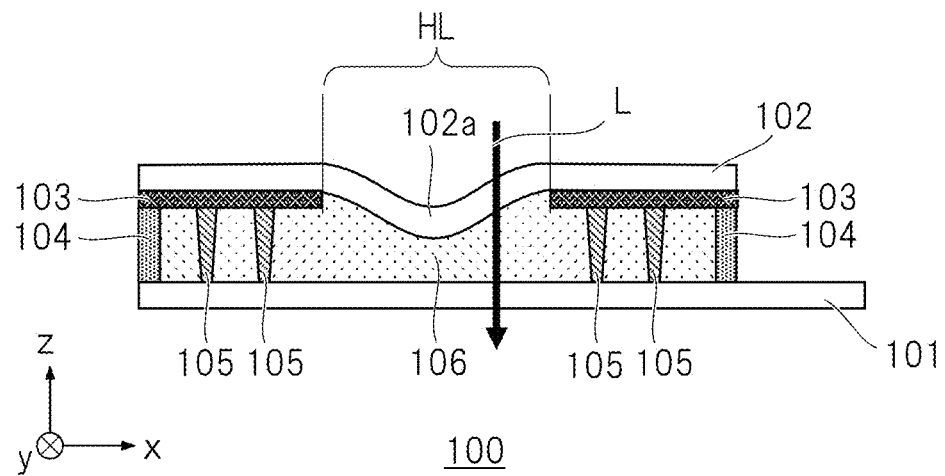
FIG. 10A is a schematic diagram of a liquid crystal panel where no spacer is arranged in a hole region.
Figure 10B:
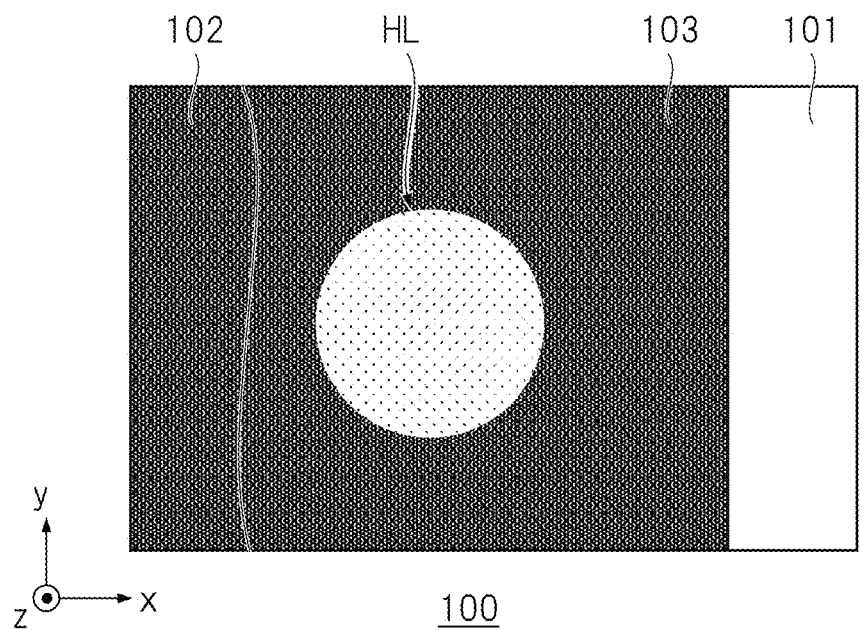
FIG. 10B is a schematic diagram of the liquid crystal panel where no spacer is arranged in the hole region.

FIGS. 10A and 10B are schematic diagrams each illustrating a liquid crystal panel where no spacer is arranged in a region corresponding to a hole. FIG. 10A schematically illustrates a liquid crystal panel 100 as viewed in a direction perpendicular to a light passage direction. FIG. 10B schematically illustrates the liquid crystal panel 100 as viewed in the light passage direction. Here, a direction in which the light passes through the hole, i.e., a substrate-to-substrate direction is defined as a z-direction, and two directions perpendicular to the z-direction and orthogonal to each other are respectively defined as an x-direction and a y-direction (the same applies below).

As illustrated in FIGS. 10A and 10B, the liquid crystal panel 100 includes: a first substrate 101 having a flat plate shape spreading in an x-y plane and allowing light "L" such as visible light to pass through; and a second substrate 102 arranged to face the first substrate 101 and allowing the light L such as visible light to pass through. A light shielding film 103 is arranged along an inner surface of the second substrate 102. A hole HL having a circular shape is formed in the light shielding film 103.

A seal part 104 extending along a peripheral edge of the second substrate 102 is attached to a region between the first substrate 101 and the light shielding film 103, and a plurality of spacers 105 are further arranged an outer side of a region corresponding to the hole HL to be spaced apart from one another on. A region surrounded by the first substrate 101, the second substrate 102, and the seal part 104 is filled with a liquid crystal 106. The spacers 105 are not arranged in the region corresponding to the hole HL between the substrates of the liquid crystal panel 100 in order to eliminate the influence on the light L that passes through the hole HL.

However, if the spacers 105 are not arranged in the region corresponding to the hole HL between the substrates of the liquid crystal panel 100, rigidity of a portion 102a of the second substrate 102, the portion corresponding to the hole HL, decreases. If the rigidity is low, the portion 102a may be deformed to have a shape recessed inward as illustrated in FIG. 10A when receiving a pressing force due to atmospheric pressure.

If the portion 102a of the second substrate 102, the portion corresponding to the hole HL, is deformed by the atmospheric pressure, a portion where the substrate-to-substrate distance is small occurs in the region corresponding to the hole HL in the liquid crystal panel 100, and therefore, the substrate-to-substrate distance is ununiformed. If the substrate-to-substrate distance is ununiformed in the region corresponding to the hole HL, the thickness of the liquid crystal 106 is ununiformed, and a light shielding factor provided when the region is set to the light shielding state is ununiformed.

Under circumstances described above, it should be understood that the technique for the liquid crystal panel having the hole that allows the light to pass through and to be shielded and being capable of suppressing the influence on the light that attempts to pass through the hole has been desired.

The present inventors have devised the present invention to solve the above-described issues. Embodiments of the present invention will be described below. Note that each of the embodiments described below is an example for embodying the present invention, and does not limit a technical scope of the present invention. In the following embodiments, components having the same functions are respectively denoted by the same reference signs, and repetitive description thereof will be omitted unless otherwise required.

First Embodiment

Structural Feature of Liquid Crystal Panel According to First Embodiment

As a result of vigorous studies, the present inventors have devised a technical idea related to a structure of a liquid crystal panel as described below, as means for solving the above-described issues.

Figure 1A:
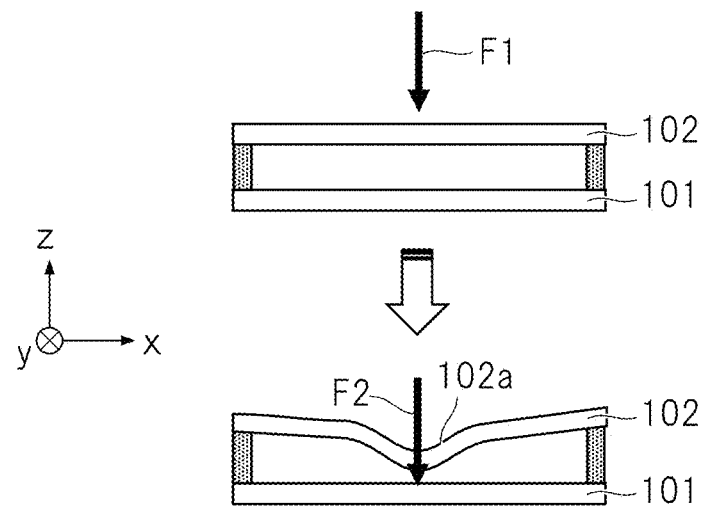
FIG. 1A is a diagram for explaining a feature of a structure of a liquid crystal panel according to a first embodiment.
Figure 1B:
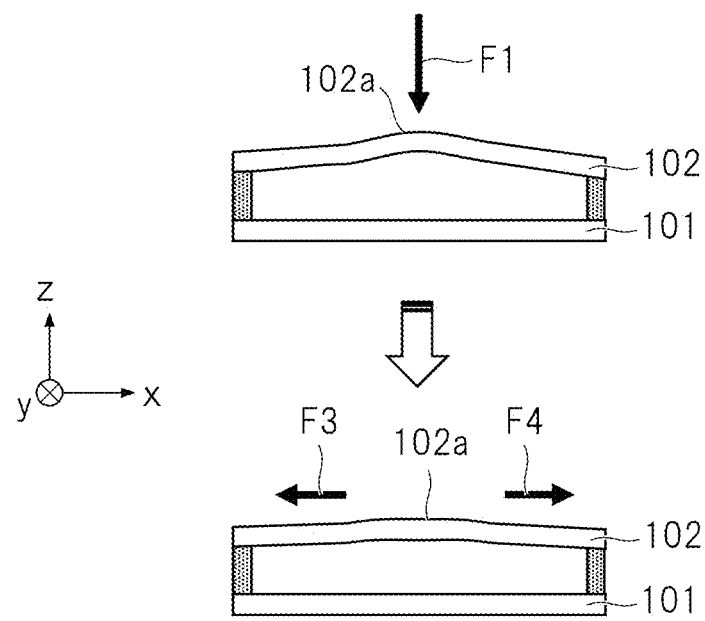
FIG. 1B is a diagram for explaining a feature of the structure of the liquid crystal panel according to the first embodiment.

FIGS. 1A and 1B are diagrams each illustrating a feature of a structure of a liquid crystal panel according to a first embodiment. The drawings are each a schematic diagram of a principal part of the liquid crystal panel as viewed in the y-direction. As illustrated in FIG. 1A, a pressing force F1 due to atmospheric pressure is applied to a second substrate 102 arranged to face a first substrate 101. If the second substrate 102 has a general flat plate shape, as illustrated in FIG. 1A, the pressing force F1 is applied as a force F2 in a direction perpendicular to a planar direction of the second substrate 102. As described above, the second substrate 102 is deformed to be recessed toward the first substrate 101 side.

On the other hand, as illustrated in FIG. 1B, the second substrate 102 is previously configured to remain shaped to project in a direction opposite to the first substrate 101 side. Accordingly, the pressing force F1 to be applied to the second substrate 102 is changed into forces F3 and F4 dispersed in a spread direction of the second substrate 102 to suppress the second substrate 102 from being deformed to be recessed toward the first substrate 101 side. In this case, even if no spacer is arranged between the substrates corresponding to the hole, a portion of the second substrate 102, the portion corresponding to the hole, is difficult to be deformed to be recessed by the atmospheric pressure. That is, in the portion 102a of the second substrate 102, the portion corresponding to the hole, there are no or fewer portions where the substrate-to-substrate distance is small. As a result, distortion of the portion 102a of the second substrate 102, the portion corresponding to the hole, is suppressed. Even if the region corresponding to the hole between the substrates is set to the light shielding state, the phenomenon that is the small thickness of the liquid crystal can also be suppressed.

A feature of the technical idea related to the structure of the liquid crystal panel devised by the present inventors is that, as would be understood from the above description, the substrate-to-substrate distance in a peripheral region of the hole becomes larger as coming closer to the hole, in other words, becomes smaller as coming farther from the hole. According to the configuration, the second substrate in the peripheral region is inclined to be an upward slope toward the hole. By the inclination of the second substrate, the portion of the second substrate, the portion corresponding to the hole, has a shape protruding in a direction extending from the first substrate to the second substrate.

Therefore, the technical idea devised by the present inventors can suppress the influence on the light that attempts to pass through the hole while the liquid crystal panel has the hole that allows the light to pass through and to be shielded.

The following is explanation with reference to drawings, for a plurality of examples of a liquid crystal panel configured such that the substrate-to-substrate distance in the peripheral region of the hole becomes larger as coming closer to the hole and such that a portion of a second substrate, the portion corresponding to the hole, has a shape protruding in a direction extending from the first substrate to the second substrate.

Note that each of the drawings in the present application illustrates only a principal part required to understand the feature of the structure of the liquid crystal panel in order to support the understanding of the feature, and illustration of elements such as an electrode, an electric wiring, and a semiconductor, which may be required in mounting, may be omitted.

First Example

Figure 2A:
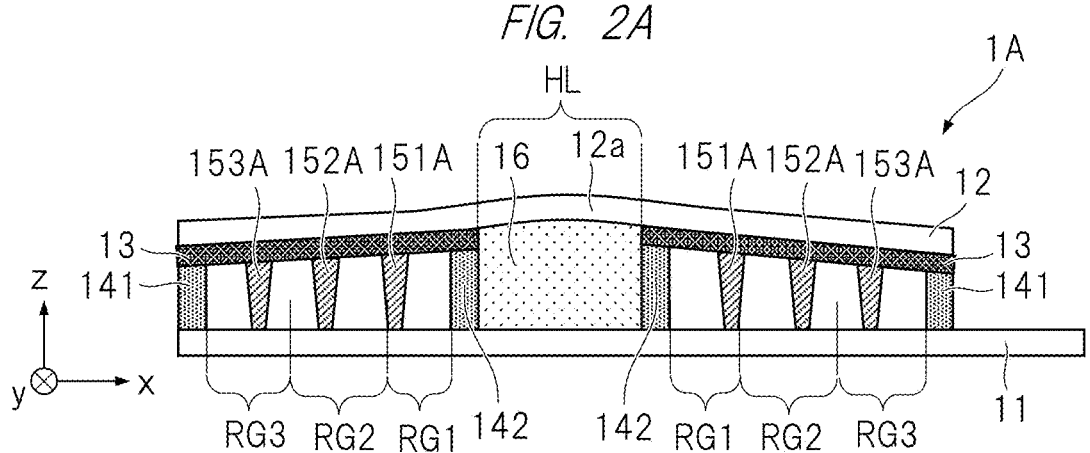
FIG. 2A is a diagram schematically illustrating a structure of a liquid crystal panel according to a first example.
Figure 2B:
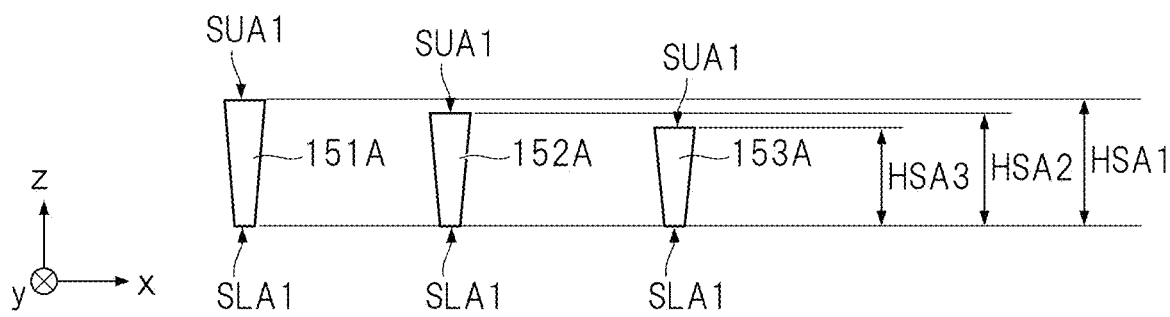
FIG. 2B is a diagram schematically illustrating the structure of the liquid crystal panel according to the first example.

FIGS. 2A, 2B, diagrams each schematically 2C are illustrating a structure of a liquid crystal panel according to a first example. The liquid crystal panel according to the first example is configured such that the spacer becomes longer as coming closer to the hole, in at least an outer peripheral region of a hole in an outer region of the hole.

As illustrated in FIG. 2A, a liquid crystal panel 1A according to the first example includes a first substrate 11, a second substrate 12, a light shielding film 13, a first seal part 141, a second seal part 142, spacers 151A, 152A, and 153A, and a liquid crystal 16.

Figure 2C:
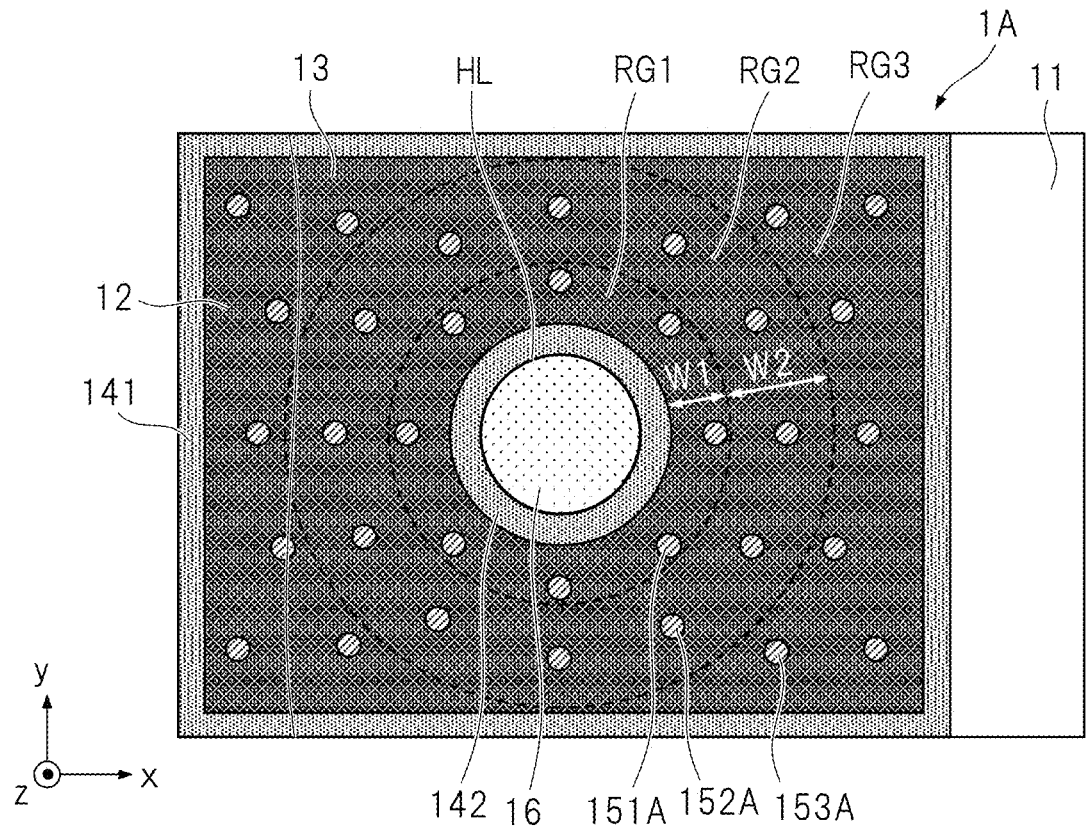
FIG. 2C is a diagram schematically illustrating the structure of the liquid crystal panel according to the first example.

The first substrate 11 has a flat plate shape, and is configured to allow visible light to pass through. The second substrate 12 is arranged to face the first substrate 11, and is configured to allow visible light to pass through. The light shielding film 13 is arranged to spread along an inner surface of the second substrate 12 as illustrated in FIG. 2A, and has a hole HL having a circular shape formed therein as illustrated in FIG. 2C. The light shielding film 13 is made of, for example, a metal or resin.

The first seal part 141 is arranged along an outer edge of the second substrate 12 between the first substrate 11 and the second substrate 12, and is tightly connected to the first substrate 11 and the second substrate 12. The second seal part 142 is arranged along an outer periphery of the hole HL between the first substrate 11 and the second substrate 12, and is tightly connected to the first substrate 11 and the second substrate 12. That is, the second seal part 142 is formed to surround a columnar region of a region between the first substrate 11 and the second substrate 12, the region corresponding to the hole HL, and has a cylindrical shape.

The spacers 151A, 152A, and 153A are arranged in an outer region of the hole HL between the first substrate 11 and the light shielding film 13. The respective numbers of the spacers 151A, the spacers 152A, and the spacers 153A are plural. As illustrated in FIGS. 2A and 2C, the spacers 151A are arranged to be two-dimensionally spaced apart from one another inside a first region RG1 relatively closer to the hole HL in an x-y planar direction. The spacers 153A are arranged to be two-dimensionally spaced apart from one another inside a third region RG3 relatively farther from the hole HL in the x-y planar direction. The spacers 152A are arranged to be two-dimensionally spaced apart from one another inside a second region RG2 positioned between the first region RG1 and the third region RG3 in the x-y planar direction. Note that the spacer described in each of the examples has, for example, a columnar shape extending in the substrate-to-substrate direction that is a direction perpendicular to a planar direction of the first substrate 11 or a spherical shape unless otherwise specified, and the same applies below.

Here, it is assumed that all the spacers 151A to the spacers 153A are arranged at the same arrangement density. The first region RG1 is an annular region having a width W1 concentrically formed around the center of the hole HL, and the second region RG2 is an annular region having a width W2 concentrically formed around the center of the hole HL.

The spacers 151A, 152A, and 153A each have a conical shape, i.e., a columnar shape in which upper and lower circles are different in size. As illustrated in FIG. 2B, the respective base areas of the spacers 151A, 152A, and 153A on the first substrate 11 side are the same base area SLA1. The respective base areas of the spacers 151A, 152A, and 153A on the second substrate 12 side are also the same base area SUA1. On the other hand, the respective lengths of the spacers 151A, 152A, 153A in the z-direction are not the same. The lengths of the spacers 151A, 152A, and 153A in the z-direction are HSA1, HSA2, and HSA3, respectively. The spacers 151A to 153A are configured such that the respective lengths HSA1, HSA2, and HSA3 in the z-direction satisfy a relationship of "HSA1>HSA2≥HSA3". Note that the spacers 151A, 152A, and 153A are made of the same material such as plastic resin.

The liquid crystal 16 in the region corresponding to the hole HL is sandwiched between the first substrate 11 and the second substrate 12. That is, the liquid crystal 16 is sealed into a region surrounded by the first substrate 11, the second substrate 12, and the second seal part 142, i.e., into a tube where the second seal part 142 is formed.

In the liquid crystal panel 1A configured as described above, the respective lengths of the spacers 151A to 153A in the z-direction increase as coming closer to the hole HL. Accordingly, the substrate-to-substrate distance between the first substrate 11 and the second substrate 12 becomes larger as coming closer to the hole HL. That is, the second substrate 12 inclines from the first substrate 11 to be an upward slope toward the hole HL. Due to the inclined structure of the second substrate 12, the portion 12a of the second substrate 12, the portion corresponding to the hole HL, has a shape protruding in a direction extending from the first substrate 11 to the second substrate 12.

The liquid crystal panel 1A according to the first example is configured such that the respective lengths of the spacers increase as coming closer to the hole of the light shielding film. Due to the configuration, an outer peripheral region of a region of the second substrate 12, the region corresponding to the hole HL, is inclined upward to the hole HL, and the substrate-to-substrate distance becomes larger as coming closer to the hole HL. As a result, the portion 12a of the second substrate 12, the portion corresponding to the hole HL, is curved to be difficult to be recessed inward, and therefore, the decrease of the substrate-to-substrate distance in the region corresponding to the hole HL, i.e., the decrease of the gap between the substrates can be suppressed.

Note that, for example, a collective forming method by photolithography using a halftone mask is considered as a method for changing the respective lengths (heights) of the spacers in the z-direction.

The first example is an example in which the outer region of the hole HL in the x-y planar direction is divided into three regions depending on the closeness to the hole HL. However, the outer region may be divided into two regions or three or more regions.

If the outer region is divided into two regions, a relationship of "HSA1>HSA2" may be satisfied in assumption that the region closest to the hole HL is set as a first region RG1, that the region next closest to the hole HL is set as a second region RG2, that the length of the spacer 151A arranged in the first region RG1 is set as "HSA1", and that the length of the spacer 152A arranged in the second region RG2 is set as "HSA2".

If the outer region is divided into three or more regions, a relationship of "HSA1>HSA2≥HSA3≥ . . . " may be satisfied in assumption that the regions are respectively set as RG1, RG2, RG3, . . . in order of the closeness (closest to farthest) to the hole HL, and that the respective lengths of the spacers arranged in the regions are set as HSA1, HSA2, HSA3, . . . .

Examples of Specific Ranges Related to Common Dimensions Among All Examples

Here, examples of specific ranges related to common dimensions among all the examples will be described.

Hole Diameter: φ1 mm to φ50 mm
Spacer Length (Height): 1 μm to 100 μm (desirably 1 μm to 20 μm)
Base Diameter of Spacer on First Substrate Side: 1 μm to 20 μm (desirably 1 μm to 15 μm) * In case of circular or approximately circular base shape
Base Area Ratio of Spacer on First Substrate Side: 0.001% to 2% (desirably 0.01% to 0.5%) * The base area ratio is a sum of respective base areas of the spacers on the first substrate side per panel unit area of the liquid crystal panel (a ratio of a sum of the respective base areas of the spacers on the first substrate side to the panel unit area).
Width of First Region in Radial Direction: 1 mm to 20 mm (desirably 2 mm to 10 mm)
Width of Second Region in Radial Direction: 1 mm or more (desirably 2 mm or more)
Width of Seal Part: 0.1 mm to 3 mm (desirably 0.2 mm to 2 mm)

Specific Examples of Dimensions in First Example

Figure 3A:
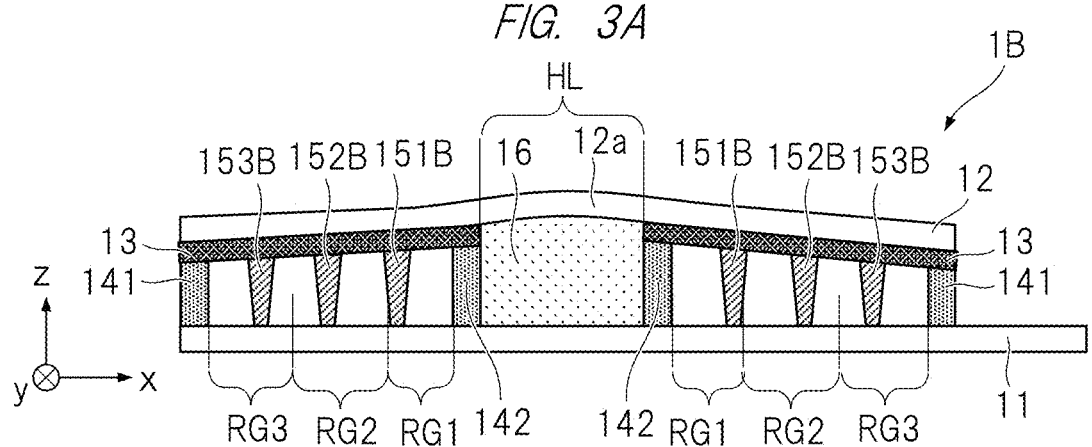
FIG. 3A is a diagram schematically illustrating a structure of a liquid crystal panel according to a second example.
Figure 3B:
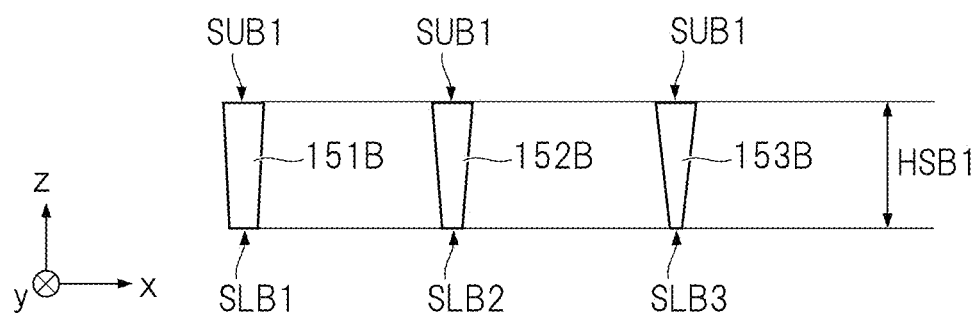
FIG. 3B is a diagram schematically illustrating the structure of the liquid crystal panel according to the second example.
Figure 3C:
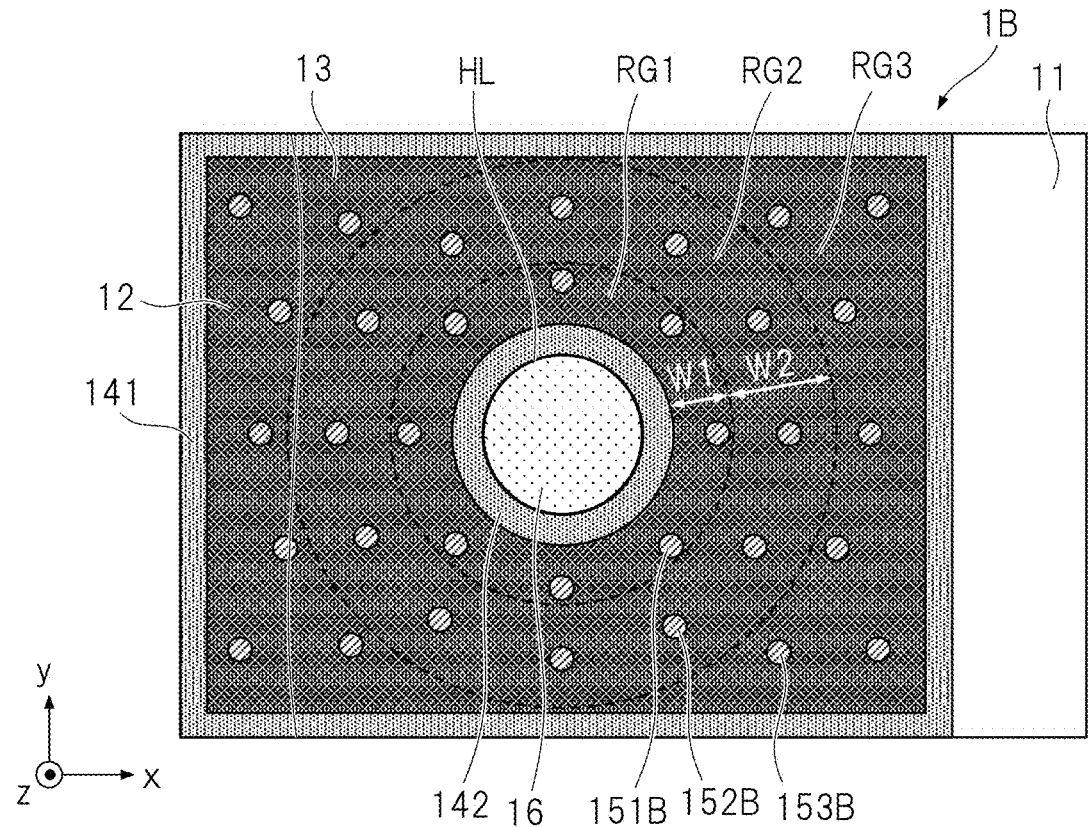
FIG. 3C is a diagram schematically illustrating the structure of the liquid crystal panel according to the second example.

Specific examples of dimensions in the first example are as follows:
Diameter of Hole HL: φ10 mm
Length of Spacer 151A: 3 μm
Length of Spacer 152A: 2.6 μm
Length of Spacer 153A: 2.4 μm
Respective Base Diameters of Spacers 151A to 153A on First Substrate Side: 8 μm
Respective Base Area Ratios of Spacers 151A to spacers 153A on First Substrate Side: 0.08%
Width of First Region RG1: 3 mm
Width of Second Region RG2: 5 mm
Width of First Seal Part 141:0.8 mm
Width of Second Seal Part 142:0.8 mm Second Example FIGS. 3A, 3B, and 3C are diagrams each schematically illustrating a structure of a liquid crystal panel according to a second example. The liquid crystal panel according to the second example is similar in configuration to that according to the first example except that the base area ratio of the spacers on the first substrate side differs from that in the first example. The liquid crystal panel according to the second example is configured such that the spacers arranged in the respective regions are the same in length while the base area ratios of the plurality of spacers on the first substrate side in the respective regions increase as coming closer to the hole.

According to such a configuration, when the same force in the z-direction is applied to the spacers, the lower the base area ratio of the spacers on the first substrate side is, the larger a deformation amount (recessed amount) of the spacers is, and conversely, the larger the base area ratio of the spacers on the first substrate side is, the smaller the deformation amount (recessed amount) of the spacers is. That is, a group of spacers having a small base area ratio is lower in the entire rigidity than a group of spacers having a large base area ratio, and therefore, is recessed in the substrate-to-substrate direction by a pressing force due to atmospheric pressure after being mounted, and its spacer length is reduced. By such a principle, the spacer lengths can be made different from one another.

As a method for changing the base area ratio of spacers on the first substrate side, a method (1) of changing an arrangement density of spacers having the same base area or base diameter on the first substrate side (the number of spacers arranged per unit area), a method (2) of changing the base area or base diameter of spacers on the first substrate side without changing the arrangement density of the spacers, a method (3) of changing both the base area or base diameter and the arrangement density of spacers on the first substrate side, and others may be employed. Here, the employment of the method (3) will be described as an example.

As illustrated in FIG. 3A, a liquid crystal panel 1B according to the second example includes the first substrate 11, the second substrate 12, the light shielding film 13, the first seal part 141, the second seal part 142, spacers 151B, 152B, and 153B, and the liquid crystal 16. Note that elements other than the spacers among elements included in the liquid crystal panel 1B are similar in configurations to those in the first example, and therefore, description thereof will be omitted here.

As illustrated in FIGS. 3A and 3C, the spacer 151B is arranged inside the first region RG1 relatively closer to the hole HL while the spacer 153B is arranged inside the third region RG3 relatively farther from the hole HL, as similar to the first example. The spacer 152B is arranged inside the second region RG2 positioned between the first region RG1 and the third region RG3.

As illustrated in FIG. 3B, the respective lengths of the spacers 151B, 152B, and 153B in the z-direction are the same length HSB1. The respective base areas of the spacers 151B, 152B, and 153B on the second substrate 12 side are also the same base area SUB1. On the other hand, the respective base areas of the spacers 151B, 152B, and 153B on the first substrate 11 side differ from one another. The base areas of the spacers 151B, 152B, and 153B on the first substrate 11 side are respectively set as SLB1, SLB2, and SLB3. The spacers 151B to 153B are configured such that the respective base areas SLB1, SLB2, and SLB3 on the first substrate 11 side satisfy a relationship of "SLB1>SLB2≥SLB3".

The spacers 151B to the spacers 153B are configured such that their respective arrangement densities MB1, MB2, and MB3 in the regions RG1, RG2, and RG3 satisfy a relationship of "MB1>MB2≥MB3".

In the liquid crystal panel 1B configured as described above, the base area ratios of the spacers on the first substrate side increase as coming closer to the hole HL. In other words, the base area ratios decrease as coming farther from the hole HL. The smaller the base area ratio of the spacers is, the larger the amount of the spacers recessed in the z-direction by the pressing force due to atmospheric pressure is. As a result, the respective lengths of the spacers in the z-direction are small. From such a principle, the substrate-to-substrate distance that is the distance between the first substrate 11 and the second substrate 12 becomes larger as coming closer to the hole HL. That is, the second substrate 12 inclines from the first substrate 11 to be an upward slope toward the hole HL. Due to the inclined structure of the second substrate 12, the portion 12a of the second substrate 12, the portion corresponding to the hole HL, has a shape protruding in a direction extending from the first substrate 11 to the second substrate 12.

The liquid crystal panel 1B according to the second example is configured such that the base area ratios of the plurality of spacers on the first substrate 11 side in the respective regions increase as coming closer to the hole. Because of such a configuration, when the same force in the z-direction is applied to the spacers, the smaller the base area ratio of the spacers on the first substrate 11 side is, the larger the deformation amount (recessed amount) of the spacers is, and conversely, the larger the base area ratio is, the smaller the deformation amount of the spacers is, and therefore, the spacer can be made longer as coming closer to the hole HL. That is, an outer peripheral region of a region of the second substrate 12, the region corresponding to the hole HL, is inclined to rise toward the hole HL, and the substrate-to-substrate distance can be made larger as coming closer to the hole HL. As a result, the portion 12a of the second substrate 12, the portion corresponding to the hole HL, is curved to be difficult to be recessed inward, and therefore, the decrease of the substrate-to-substrate distance in the region corresponding to the hole HL, i.e., the decrease of the gap between the substrates can be suppressed.

The second example is an example in which the outer region of the hole HL in the x-y planar direction is divided into three regions depending on the closeness to the hole HL. However, the outer region may be divided into two regions or three or more regions.

If the outer region is divided into two regions, the liquid crystal panel 1B may configured to satisfy a relationship of "MB1>MB2" in assumption that the region closest to the hole HL is set as a first region RG1, that the region next closest to the hole HL is set as a second region RG2, that the base area ratio of the spacers 151B arranged in the first region RG1 on the first substrate 11 side is set as MB1, and that the base area ratio of the spacers 152B arranged in the second region RG2 on the first substrate 11 side is set as MB2.

If the outer region is divided into three or more regions, the liquid crystal panel 1B may be configured to satisfy a relationship of "MB1>MB2≥MB3≥ . . . " in assumption that the regions are respectively set as RG1, RG2, RG3, . . . in order of the closeness (closest to farthest) to the hole HL, and that the respective base area ratios of the spacers arranged in the regions on the first substrate side are set as MB1, MB2, MB3, . . . .

In the second example, the respective base areas of the spacers 151B to 153B on the second substrate 12 side are made the same while the respective base areas of the spacers 151B to 153B on the first substrate 11 side are changed depending on the closeness to the hole HL. However, the respective base areas of the spacers 151B to 153B on the first substrate 11 side may be made the same while the respective base areas on of the spacers 151B to 153B the second substrate 12 side may be changed depending on the closeness to the hole HL.

Specific Examples of Dimensions in Second Example

Figure 4A:
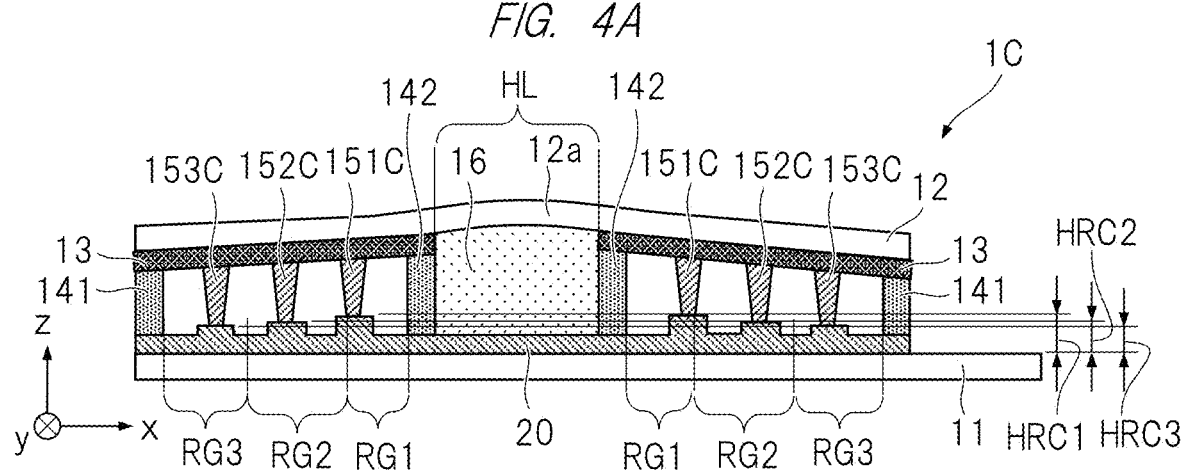
FIG. 4A is a diagram schematically illustrating a structure of a liquid crystal panel according to a third example.
Figure 4B:
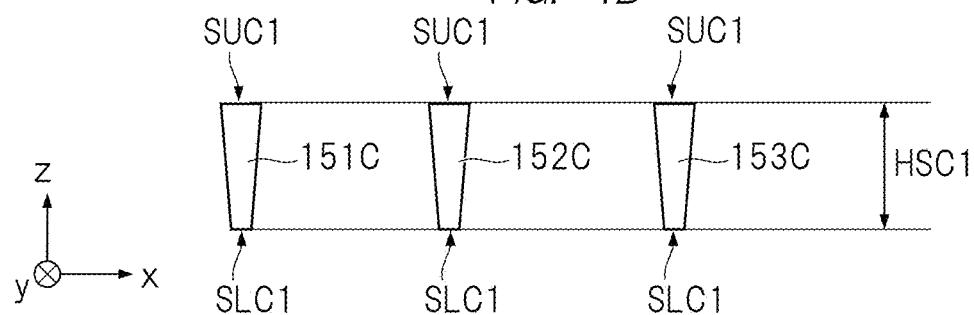
FIG. 4B is a diagram schematically illustrating the structure of the liquid crystal panel according to the third example.
Figure 4C:
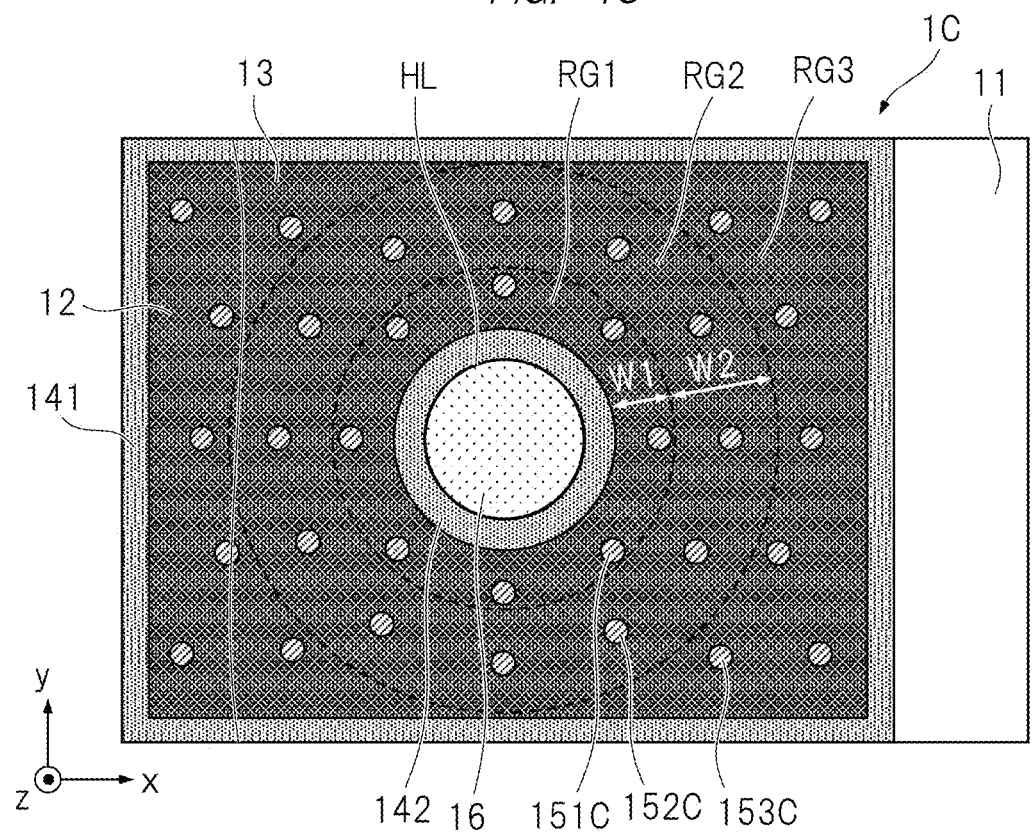
FIG. 4C is a diagram schematically illustrating the structure of the liquid crystal panel according to the third example.

Specific examples of dimensions in the second example are as follows:
Diameter of Hole HL: φ10 mm
Length of Spacer 151B: 3 μm Length of Spacer 152B: 3 µm
Length of Spacer 153B: 3 µm
Respective Base Diameters of Spacers 151B to 153B on First Substrate Side: 8 µm
Base Area Ratios of Spacers 151B on First Substrate Side: 0.08%
Base Area Ratios of Spacers 152B on First Substrate Side: 0.02%
Base Area Ratios of Spacers 153B on First Substrate Side: 0.02%
Width of First Region RG1: 3 mm
Width of Second Region RG2: 5 mm
Width of First Seal Part 141:0.8 mm
Width of Second Seal Part 142:0.8 mm Third Example FIGS. 4A, 4B, and 4C are diagrams each schematically illustrating a structure of a liquid crystal panel according to a third example. The liquid crystal panel according to the third example is similar in configuration to that according to the first example except that the spacer shape differs from that in the first example and except that an underlying film is formed. The liquid crystal panel according to the third example is configured such that the underlying film is formed between the first substrate and the spacer, and such that the spacers are the same in length while the closer the spacer is, the thicker the underlying film at a position corresponding to the spacer is.

As illustrated in FIG. 4A, a liquid crystal panel 1C according to the third example includes the first substrate 11, the second substrate 12, the light shielding film 13, the first seal part 141, the second seal part 142, spacers 151C, 152C, and 153C, the liquid crystal 16, and an underlying film 20. The underlying film 20 is, for example, an insulating film. Note that elements other than the spacers 151C to 153C and the underlying film 20 among elements included in the liquid crystal panel 1C are similar in configurations to those in the first example, and therefore, description thereof will be omitted here.

As illustrated in FIG. 4A, the underlying film 20 is arranged to spread along an inner surface of the first substrate 11. The spacers 151C, 152C, and 153C are arranged between the underlying film 20 and the light shielding film 13. As illustrated in FIGS. 4A and 4C, the spacer 151C is arranged inside the first region RG1 relatively closer to the hole HL while the spacer 153C is arranged inside the third region RG3 relatively farther from the hole HL, as similar to the first example. The spacer 152C is arranged inside the second region RG2 positioned between the first region RG1 and the third region RG3.

Here, it is assumed that all the spacers 151C to the spacers 153C are arranged at the same arrangement density. The first region RG1 is an annular region having a width W1 concentrically formed around the center of the hole HL, and the second region RG2 is an annular region having a width W2 concentrically formed around the center of the hole HL.

As illustrated in FIG. 4B, the respective lengths of the spacers 151C, 152C, and 153C in the z-direction are the same length HSC1. The respective base areas of the spacers 151C, 152C, and 153C on the first substrate 11 side are also the same base area SLC1. The respective base areas of the spacers 151C, 152C, and 153C on the second substrate 12 side are also the same base area SUC1. On the other hand, the underlying film 20 differs in thickness depending on its position.

As illustrated in FIG. 4A, in the underlying film 20, its thickness at a position corresponding to the spacer 151C is a thickness HRC1, its thickness at a position corresponding to the spacer 152C is a thickness HRC2, and its thickness at a position corresponding to the spacer 153C is a thickness HRC3. The underlying film 20 is configured such that the thicknesses HRC1, HRC2, and HRC3 satisfy a relationship of "HRC1>HRC2≥HRC3".

In the liquid crystal panel 1C configured as described above, the respective thicknesses of the underlying film 20 at the positions corresponding to the spacers 151C to 153C increase as coming closer to the hole HL, in other words, the thicknesses decrease as coming farther from the hole HL. In the spacers 151C to 153C, their respective lengths in the z-direction are the same, their respective base areas are also the same, and their respective materials are also the same. Therefore, the substrate-to-substrate distance between the first substrate 11 and the second substrate 12 becomes larger as coming closer to the hole HL. That is, the second substrate 12 inclines from the first substrate 11 to be an upward slope toward the hole HL. Due to the inclined structure of the second substrate 12, the portion 12a of the second substrate 12, the portion corresponding to the hole HL, has a shape protruding in a direction extending from the first substrate 11 to the second substrate 12.

The liquid crystal panel 1C according to the third example has the underlying film between the first substrate and the spacer, and is configured such that the spacers are the same in length while the closer the spacer is to the hole, the thicker the underlying film at the position corresponding to the spacer is. If the spacers are the same in length, the substrate-to-substrate distance corresponding to the position of any spacer is made large by the thickness of the underlying film at the position. Therefore, the outer peripheral region of the region of the second substrate 12, the region corresponding to the hole, is inclined to rise toward the hole, and the substrate-to-substrate distance can be made larger as coming closer to the hole. As a result, the portion of the second substrate, the portion corresponding to the hole, is curved to be difficult to be recessed inward, and therefore, the decrease of the substrate-to-substrate distance in the region corresponding to the hole, i.e., the decrease of the gap between the substrates can be suppressed.

The third example is an example in which the outer region of the hole HL in the x-y planar direction is divided into three regions depending on the closeness to the hole HL. However, the outer region may be divided into two regions or three or more regions.

If the outer region is divided into two regions, the liquid crystal panel 1C may be configured to satisfy a relationship of "HRC1>HRC2" in assumption that the region closest to the hole HL is set as a first region RG1, that the region next closest to the hole HL is set as a second region RG2, that the thickness of the underlying film 20 at the position corresponding to the spacer 151C arranged in the first region RG1 is set as HRC1, and that the thickness of the underlying film 20 at the position corresponding to the spacer 152C arranged in the second region RG2 is set as HRC2.

If the outer region is divided into three or more regions, the liquid crystal panel 1C may be configured to satisfy a relationship of "HRC1>HRC2≥HRC3≥ . . . " in assumption that the regions are respectively set as RG1, RG2, RG3, . . . in order of the closeness (closest to farthest) to the hole HL, and that the thicknesses of the underlying film 20 at the positions corresponding to the spacers arranged in the respective regions are set as HRC1, HRC2, HRC3, . . . .

Specific Examples of Dimensions in Third Example

Figure 5A:
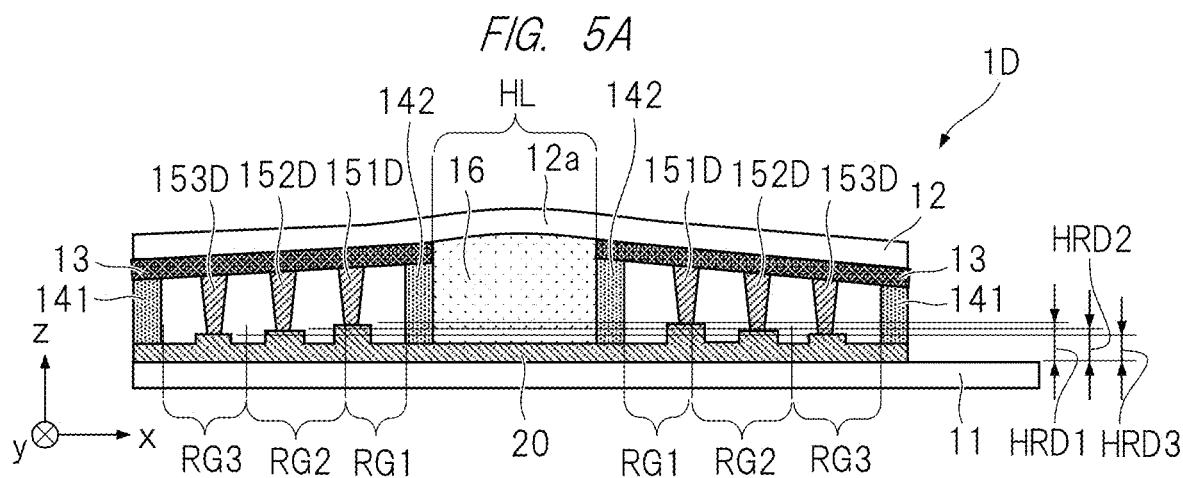
FIG. 5A is a diagram schematically illustrating a structure of a liquid crystal panel according to a fourth example.
Figure 5B:
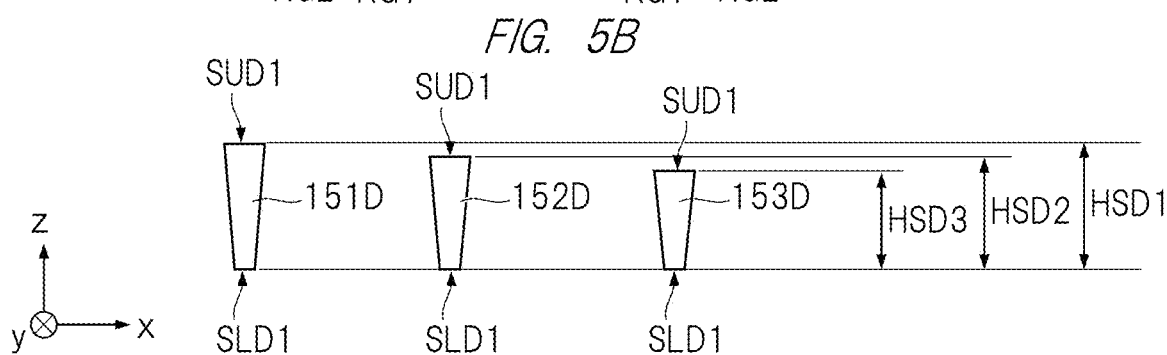
FIG. 5B is a diagram schematically illustrating the structure of the liquid crystal panel according to the fourth example.

Specific examples of dimensions in the third example are as follows:
Diameter of Hole HL: φ10 mm
Length of Spacer 151C: 2.6 μm
Length of Spacer 152C: 2.6 μm
Length of Spacer 153C: 2.6 μm
Respective Base Diameters of Spacers 151C to 153C on First Substrate Side: 8 μm
Thickness of Underlying Film 20 at Position corresponding to Spacer 151C: 0.4 μm
Thickness of Underlying Film 20 at Position corresponding to Spacer 152C: 0.2 μm
Thickness of Underlying Film 20 at Position corresponding to Spacer 153C: 0.2 μm
Width of First Region RG1: 3 mm
Width of Second Region RG2: 5 mm
Width of First Seal Part 141:0.8 mm
Width of Second Seal Part 142:0.8 mm Fourth Example FIGS. 5A, 5B, and 4C are diagrams each schematically illustrating a structure of a liquid crystal panel according to a fourth example. The liquid crystal panel according to the fourth example is made of combination of the first example and the third example. That is, the liquid crystal panel according to the fourth example is configured such that the closer the spacer is to the hole, the longer the spacer is, while the closer the spacer is to the hole, the thicker the underlying film at the position corresponding to the spacer is.

As illustrated in FIG. 5A, a liquid crystal panel 1D according to the fourth example includes the first substrate 11, the second substrate 12, the light shielding film 13, the first seal part 141, the second seal part 142, spacers 151D, 152D, and 153D, the liquid crystal 16, and the underlying film 20. Note that the elements other than the spacers 151D to 153D and the underlying film 20 among elements included in the liquid crystal panel 1D are similar in configurations to those in the first example, and therefore, description thereof will be omitted here.

Figure 5C:
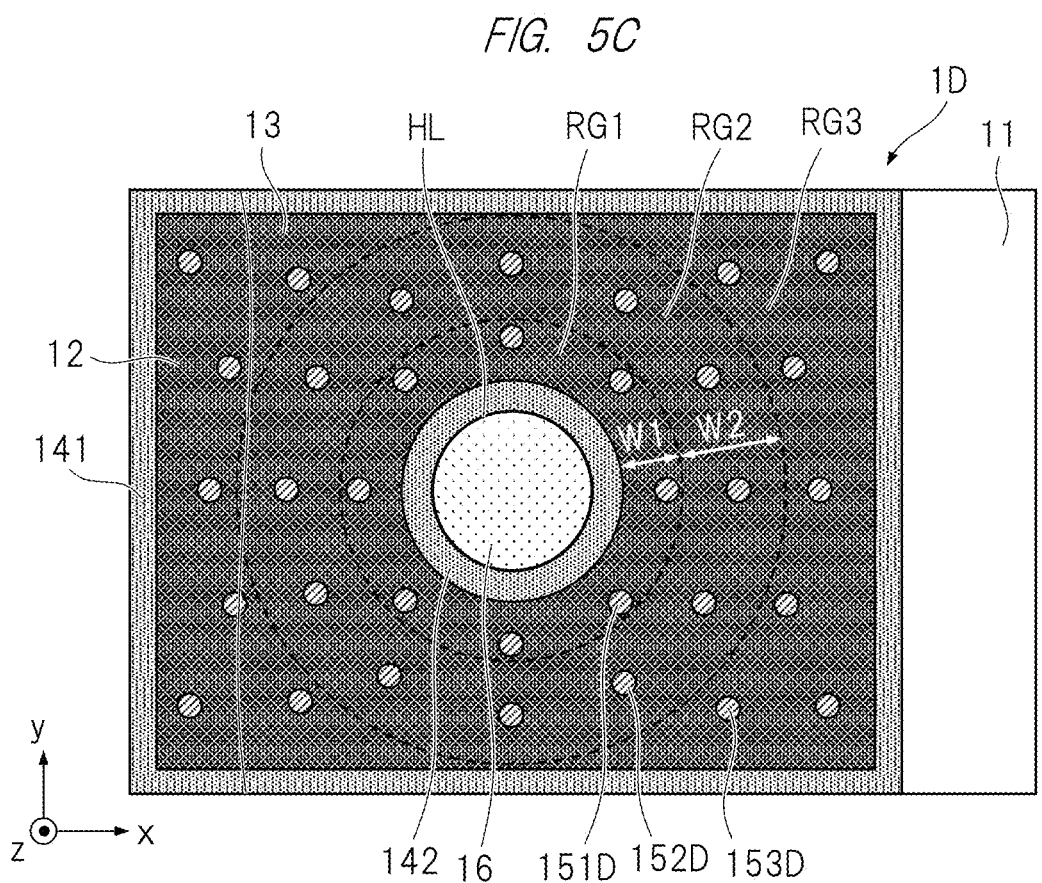
FIG. 5C is a diagram schematically illustrating the structure of the liquid crystal panel according to the fourth example.

As illustrated in FIGS. 5A and 5C, the spacer 151D is arranged inside the first region RG1 relatively closer to the hole HL while the spacer 153D is arranged inside the third region RG3 relatively farther from the hole HL, as similar to the first example. The spacer 152D is arranged inside the second region RG2 positioned between the first region RG1 and the third region RG3.

Here, it is assumed that all the spacers 151D to the spacers 153D are arranged at the same arrangement density. The first region RG1 is an annular region having a width W1 concentrically formed around the center of the hole HL, and the second region RG2 is an annular region having a width W2 concentrically formed around the center of the hole HL.

As illustrated in FIG. 5B, the respective base areas of the spacers 151D, 152D, and 153D on the first substrate 11 side are also the same base area SLD1. The respective base areas of the spacers 151D, 152D, and 153D on the second substrate 12 side are also the same base area SUD1. On the other hand, the respective lengths of the spacers 151D, 152D, and 153D in the z-direction are respectively HSD1, HSD2 and HSD3. The spacers 151D, 152D, and 153D are configured such that the respective lengths HSD1, HSD2 and HSD3 in the z-direction satisfy a relationship of "HSD1>HSD2≥HSD3".

As illustrated in FIG. 5A, in the underlying film 20, its thickness at a position corresponding to the spacer 151D is a thickness HRD1, its thickness at a position corresponding to the spacer 152D is a thickness HRD2, and its thickness at a position corresponding to the spacer 153D is a thickness HRD3. The underlying film 20 is configured such that the thicknesses HRD1, HRD2, and HRD3 satisfy a relationship of "HRD1>HRD2≥HRD3".

In the liquid crystal panel 1D configured as described above, the respective base areas of the spacers 151D, 152D, and 153D on the first substrate 11 side are also the same base area SLD1, as illustrated in FIG. 5B. The respective base areas of the spacers 151D, 152D, and 153D on the second substrate 12 side are also the same base area SUD1. On the other hand, the respective lengths of the spacers 151D, 152D, and 153D in the z-direction are different from one another. The respective lengths of the spacers 151D, 152D, and 153D in the z-direction are respectively HSD1, HSD2 and HSD3. The spacers 151D, 152D, and 153D are configured such that the respective lengths HSD1, HSD2 and HSD3 in the z-direction satisfy the relationship of "HSD1>HSD2≥HSD3".

In the liquid crystal panel 1D, the respective thicknesses HRD1, HRD2, and HRD3 of the underlying film 20 at the positions corresponding to the spacers 151D, 152D, and 153D satisfy the relationship of "HRD1>HRD2≥HRD3". That is, the respective thicknesses of the underlying film 20 at the positions corresponding to the spacers increase as coming closer to the hole HL, in other words, the thicknesses decrease as coming farther from the hole HL.

Therefore, the substrate-to-substrate distance between the first substrate 11 and the second substrate 12 becomes larger as coming closer to the hole HL. That is, the second substrate 12 inclines from the first substrate 11 to be an upward slope toward the hole HL. Due to the inclined structure of the second substrate 12, the portion 12a of the second substrate 12, the portion corresponding to the hole HL, has a shape protruding in a direction extending from the first substrate 11 to the second substrate 12.

The liquid crystal panel 1D according to the fourth example is configured such that the closer the spacer is to the hole, the longer the spacer is, while the closer the spacer is to the hole, the thicker the underlying film at the position corresponding to the spacer is. Due to the configuration, the outer peripheral region of the region of the second substrate 12, the region corresponding to the hole, is inclined to rise toward the hole, and the substrate-to-substrate distance can be made larger as coming closer to the hole. As a result, the portion of the second substrate, the portion corresponding to the hole, is curved to be difficult to be recessed inward, and therefore, the decrease of the substrate-to-substrate distance in the region corresponding to the hole, i.e., the decrease of the gap between the substrates can be suppressed.

The fourth example is an example configured such that the respective lengths HSD1, HSD2, and HSD3 of the spacers 151D, 152D and 153D satisfy the relationship of "HSD1>HSD2>HSD3", however, the example may be configured such that the lengths satisfy a relationship of "HSD1>HSD2=HSD3".

The fourth example is an example configured such that the respective thicknesses HRD1, HRD2, and HRD3 of the underlying film 20 at the positions corresponding to the spacers 151D, 152D and 153D satisfy the relationship of "HRD1>HRD2>HRD3", however, the example may be configured such that the thicknesses satisfy a relationship of "HRD1>HRD2=HRD3".

In the fourth example, the region closest to the hole HL is set as the first region RG1, and the region next closest to the hole HL is set as the second region RG2. The length of the spacer 151D in the z-direction arranged in the first region RG1 is set as HSD1, and the length of the spacer 152D in the z-direction arranged in the second region RG2 is set as HSD2. Further, the thickness of the underlying film 20 at the position corresponding to the spacer 151D arranged in the first region RG1 is set as HRD1, and the thickness of the underlying film 20 at the position corresponding to the spacer 152D arranged in the second region RG2 is set as HRD2. In this case, the liquid crystal panel 1D may be configured to satisfy a relationship of "HSD1>HSD2" and satisfy a relationship of "HRD1>HRD2".

Fifth Example

Figure 6A:
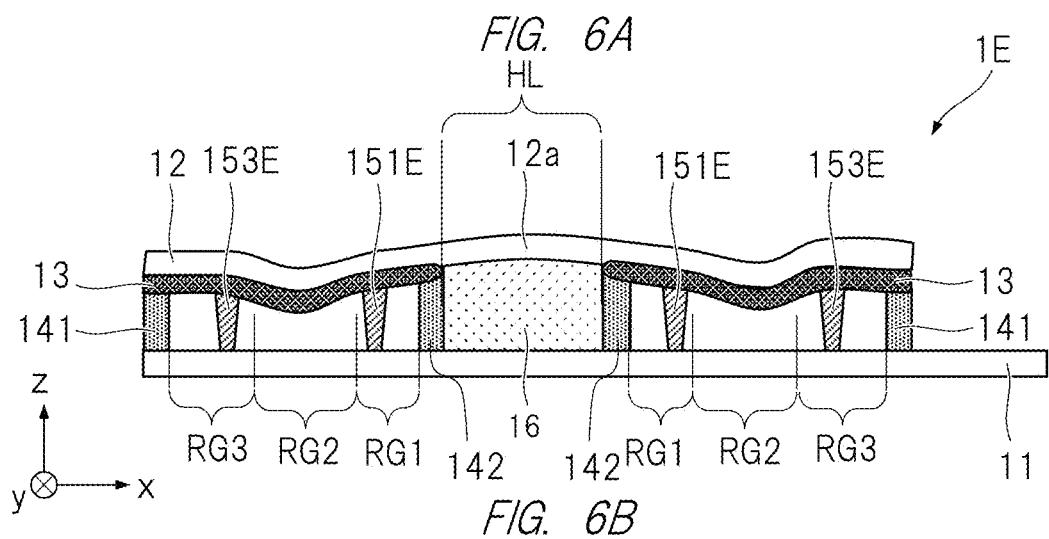
FIG. 6A is a diagram schematically illustrating a structure of a liquid crystal panel according to a fifth example.
Figure 6B:
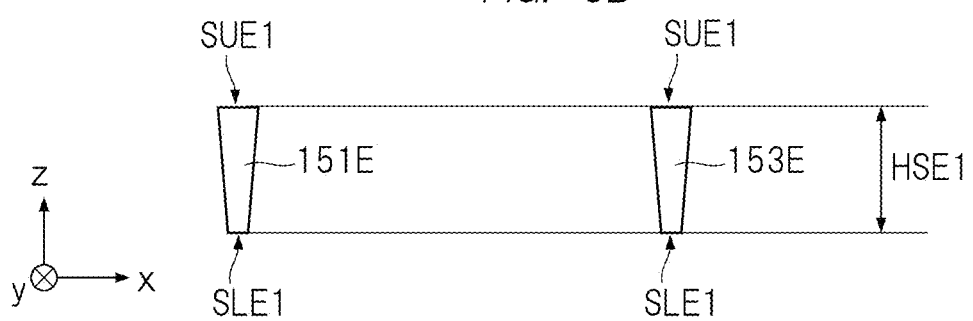
FIG. 6B is a diagram schematically illustrating the structure of the liquid crystal panel according to the fifth example.
Figure 6C:
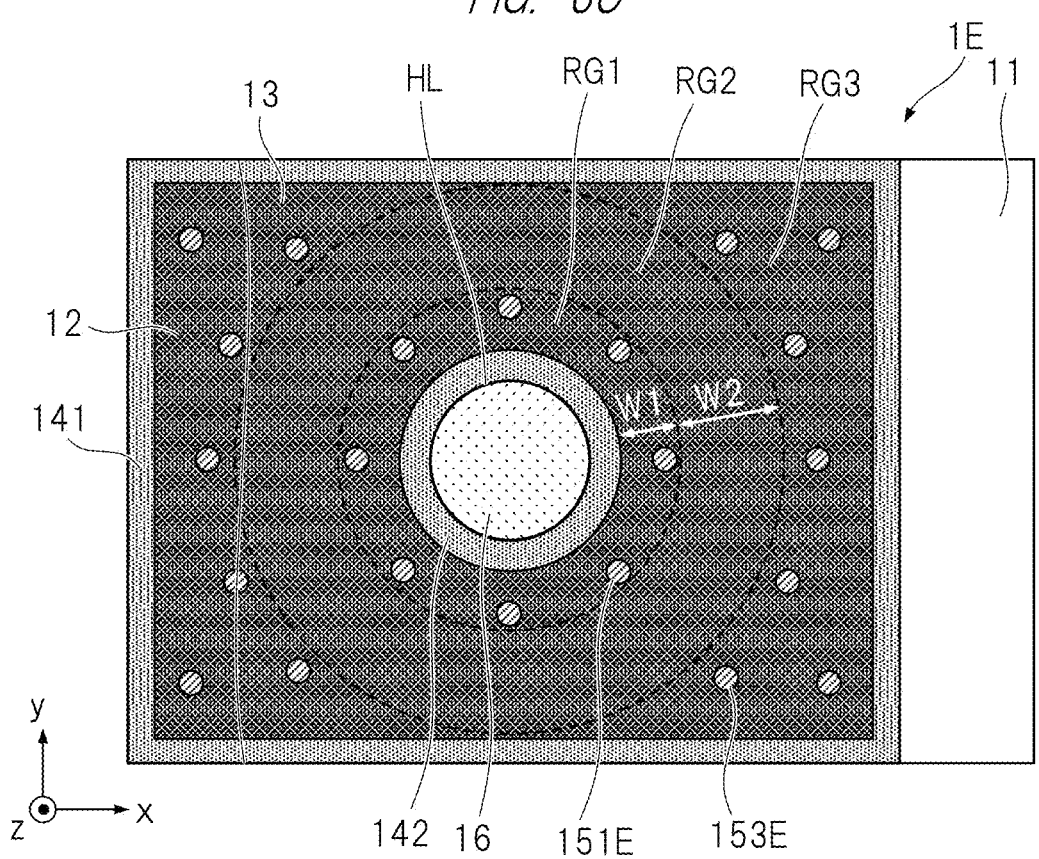
FIG. 6C is a diagram schematically illustrating the structure of the liquid crystal panel according to the fifth example.

FIGS. 6A, 6B, and 6C are diagrams each schematically illustrating a structure of a liquid crystal panel according to a fifth example. The liquid crystal panel according to the fifth example is different from that according to the first example in that the plurality of regions set on the outer region of the hole include a region without the spacer, but is substantially the same as that according to the first example except for this different configuration. The liquid crystal panel according to the fifth example is configured such that the spacer is arranged in each of the first region closer to the hole and the third region farther from the hole but is not arranged in the second region between the first region and the third region.

In the fifth example, no spacer is arranged in the second region. Accordingly, the second region of the second substrate is recessed toward in a direction from the second substrate toward the first substrate by the pressing force due to atmospheric pressure. That is, the substrate-to-substrate distance in the second region decreases (the gap between the first substrate and the second substrate decreases). As a result, the second substrate is distorted, and the portion of the second substrate, the portion corresponding to the hole, has a shape protruding in the direction extending from the first substrate to the second substrate. The length of the spacer in the z-direction arranged in the first region and the length of the spacer in the z-direction arranged in the third region may be the same as or different from each other.

As illustrated in FIG. 6A, a liquid crystal panel 1E according to the fifth example includes the first substrate 11, the second substrate 12, the light shielding film 13, the first seal part 141, the second seal part 142, spacers 151E and 153E, and the liquid crystal 16. Note that the elements other than the spacers 151E and 153E among elements included in the liquid crystal panel 1E are similar to those in the first example, and therefore, description thereof will be omitted here.

As illustrated in FIGS. 6A and 6C, the spacers 151E are arranged inside the first region RG1 relatively closer to the hole HL, and the spacers 153E are arranged inside the third region RG3 relatively farther from the hole HL, as similar to the first example. No spacer is arranged inside the second region RG2 positioned between the first region RG1 and the third region RG3.

Here, it is assumed that the spacers 151E and the spacers 153E are arranged at the same arrangement density. The first region RG1 is an annular region having a width W1 concentrically formed around the center of the hole HL, and the second region RG2 is an annular region having a width W2 concentrically formed around the center of the hole HL.

As illustrated in FIG. 6B, the respective base areas of the spacers 151E and 153E on the first substrate 11 side are the same base area SLE1. The respective base areas of the spacers 151E and 153E on the second substrate 12 side are also the same base area SUE1. The respective lengths of the spacers 151E and 153E in the z-direction are the same length HSE1. However, if a shape of the second substrate 12 in the second region RG2 is a shape recessed toward the first substrate 11 side, the respective lengths of the spacers 151E and the spacers 153E in the z-direction, the respective base areas of the same on the first substrate side, the respective base areas of the same on the second substrate side, the respective arrangement densities of the same or the like may differ from each other.

The liquid crystal panel 1E according to the fifth example is configured such that the spacer is arranged in each of the first region RG1 closer to the hole HL and the third region RG3 farther from the hole HL while no spacer is arranged in the second region RG2 between the first region RG1 and the third region RG3. Due to the configuration, the portion of the second substrate 12, the portion corresponding to the second region RG2, has the shape recessed toward the first substrate 11 side by the atmospheric pressure from outside. That is, the outer peripheral region of the region of the second substrate 12, the region corresponding to the hole HL, is inclined to rise toward the hole HL, and the substrate-to-substrate distance can be made larger as coming closer to the hole HL. As a result, the portion 12a of the second substrate 12, the portion corresponding to the hole HL, is curved to be difficult to be recessed inward, and therefore, the decrease of the substrate-to-substrate distance in the region corresponding to the hole, i.e., the decrease of the gap between the substrates can be suppressed.

Specific Examples of Dimensions in Fifth Example

Figure 7A:
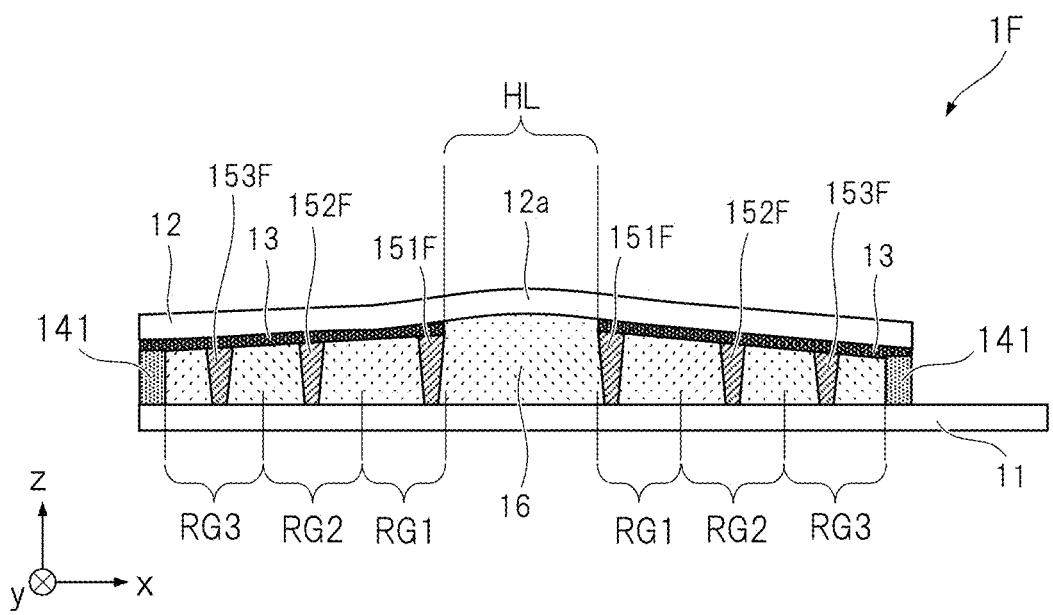
FIG. 7A is a diagram schematically illustrating a structure of a liquid crystal panel according to a sixth example.
Figure 7B:
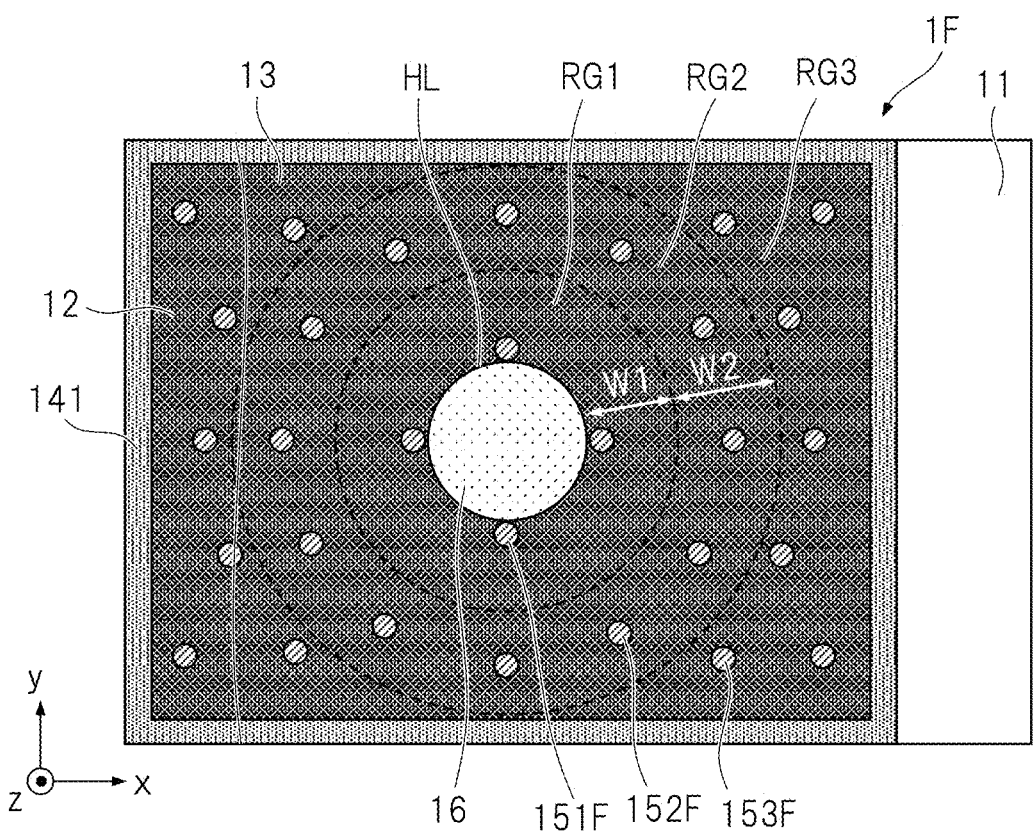
FIG. 7B is a diagram schematically illustrating the structure of the liquid crystal panel according to the sixth example.

Specific examples of dimensions in the fifth example are as follows:
Diameter of Hole HL: φ10 mm
Length of Spacer 151E: 3 μm
Length of Spacer 153E: 3 μm
Respective Base Diameters of Spacers 151E and 153E on First Substrate Side: 8 μm
Base Area Ratio of Spacers 151E and 153E on First Substrate Side: 0.08%
Width of First Region RG1: 3 mm
Width of Second Region RG2: 5 mm
Width of First Seal Part 141:0.8 mm
Width of Second Seal Part 142:0.8 mm Sixth Example FIGS. 7A and 7B are diagrams each schematically illustrating a structure of a liquid crystal panel according to a sixth example. The liquid crystal panel according to the sixth example is a modification example of the liquid crystal panel of the first example. In the liquid crystal panel according to the sixth example, no seal part is arranged around the hole in a region between the first substrate and the second substrate while the spacer is arranged in a region closer to the hole.

The liquid crystal panel according to the sixth example is different from that of the first example in that there is no second seal part while the spacer is arranged in the region of the outer region of the hole, the region being relatively closer to the hole, but is substantially the same as that of the first example except for the different configuration.

As illustrated in FIG. 7A, a liquid crystal panel 1F according to the sixth example includes the first substrate 11, the second substrate 12, the light shielding film 13, the first seal part 141, spacers 151F, 152F, and 153F, and the liquid crystal 16. Note that the elements other than the spacers 151F to 153F among elements included in the liquid crystal panel 1F are similar in configurations to those in the first example, and therefore, the description thereof will be omitted here.

As illustrated in FIGS. 7A and 7B, the spacers 151F are arranged inside the first region RG1 relatively closer to the hole HL, and the spacers 153F are arranged inside the third region RG3 relatively farther from the hole HL, as similar to the first example. The spacers 152F are arranged inside the second region RG2 positioned between the first region RG1 and the third region RG3. Here, it is assumed that the spacers 151F to the spacers 153F are arranged at the same arrangement density.

As illustrated in FIG. 7B, the respective base areas of the spacers 151F, 152F, and 153F on the first substrate 11 side are the same base area. The respective base areas of the spacers 151F, 152F, and 153F on the second substrate 12 side are also the same base area. The respective lengths of the spacers 151F, 152F, and 153F in a z-direction are not the same. When it is assumed that the lengths of the spacers 151F, 152F, and 153F in the z-direction are respectively set as HSF1, HSF2, and HSF3, the respective lengths HSF1, HSF2, and HSF3 in the z-direction are configured to satisfy a relationship of "HSF1>HSF2≧HSF3".

In the liquid crystal panel 1F according to the sixth example, in a region between the first substrate 11 and the second substrate 12, no seal part is arranged around the hole HL while the spacers 151F are arranged in a region closer to the hole HL. Due to the configuration, the outer peripheral region of the region of the second substrate 12, the region corresponding to the hole HL, is inclined to rise toward the hole HL, and the substrate-to-substrate distance can be made larger as coming closer to the hole. As a result, the portion 12a of the second substrate 12, the portion corresponding to the hole HL, is curved to be difficult to be recessed inward, and therefore, the decrease of the substrate-to-substrate distance in the region corresponding to the hole HL, i.e., the decrease of the gap between the substrates can be suppressed.

Specific Examples of Dimensions in Sixth Example

Specific examples of dimensions in the sixth example are as follows:
Diameter of Hole HL: φ10 mm
Length of Spacer 151F: 3 μm
Length of Spacer 152F: 2.6 μm
Length of Spacer 153F: 2.4 μm
Respective Base Diameters of Spacers 151F to 153F on First Substrate Side: 8 μm
Base Area Ratio of Spacers 151F to 153F on First Substrate Side: 0.08%
Width of First Region RG1: 3 mm
Width of Second Region RG2: 5 mm
Width of First Seal Part 141:0.8 mm
Width of Second Seal Part 142:0.8 mm In the above-described examples, note that the spacers 151A to 153A, the spacers 151B to 153B, the spacers 151C to 153C, the spacers 151D to 153D, the spacers 151E to 153E, and the spacers 151F to 153F each have a conical shape, respectively. However, the shape is not limited to such a shape, and may be a columnar shape such as a circular columnar shape, a polygonal columnar shape, and a polygonal columnar shape having upper and lower polygonal shapes of different sizes or may be a spherical shape if allowable.

Second Embodiment

Liquid Crystal Panel Apparatus According to Second Embodiment

A liquid crystal panel apparatus according to a second embodiment includes the liquid crystal panel according to any one of the above-described examples and a controller that controls a voltage to be applied to the liquid crystal inside the region corresponding to the hole of the liquid crystal panel.

Figure 8:
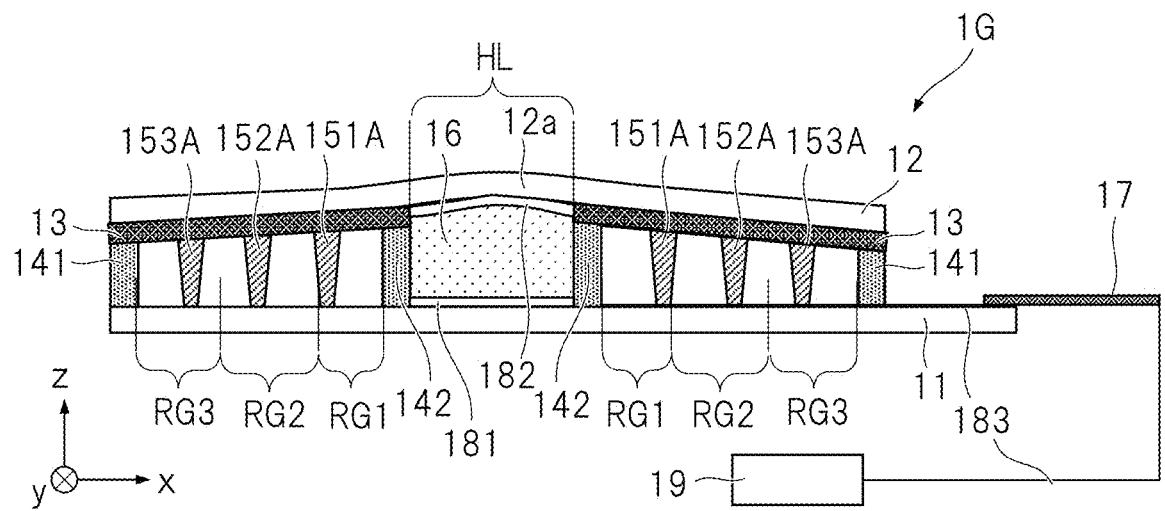
FIG. 8 is a diagram schematically illustrating an example of a liquid crystal panel apparatus according to a second embodiment.

FIG. 8 is a diagram schematically illustrating an example of the liquid crystal panel apparatus according to the second embodiment. A liquid crystal panel apparatus 30 illustrated in FIG. 8 includes a liquid crystal panel 1G and a controller 19.

The liquid crystal panel 1G includes the first substrate 11, the second substrate 12, the light shielding film 13, the first seal part 141, the second seal part 142, the spacers 151A, 152A, and 153A, and the liquid crystal 16, as similar to the liquid crystal panel 1A according to the first example. The liquid crystal panel 1G further includes a flexible substrate 17, electrodes 181 and 182, and an electric wiring 183.

The flexible substrate 17 is attached to the first substrate 11. The electrodes 181 and 182 are each a so-called transparent electrode that is an electrode made of a material that allows visible light to passes through and allows electricity to flow. The electrode 181 is arranged inside the first substrate 11 in the region corresponding to the hole HL. The electrode 182 is arranged inside the second substrate 12 in the region corresponding to the hole HL. The electric wiring 183 is arranged to electrically connect the electrodes 181 and 182 and the flexible substrate 17 to each other, and is arranged to electrically connect the flexible substrate 17 and the controller 19 to each other.

The controller 19 further has a function of applying the voltage between the electrode 181 and the electrode 182 via the flexible substrate 17 and the electric wiring 183. The controller 19 controls an orientation of the liquid crystal 16 by controlling the voltage to be applied to the electrodes 181 and 182 to set the region corresponding to the hole HL of the liquid crystal panel 1G into either the light passage state or the light shielding state. Note that the controller 19 is made of, for example, an electronic circuit, a semiconductor circuit, a dedicated IC chip, a programmable IC chip, a micro controller, a computer or the like.

In the liquid crystal panel apparatus 30 according to the second embodiment, by the controller 19 that controls the voltage to be applied to the liquid crystal 16, the region corresponding to the hole HL of the liquid crystal panel 1G can be set into the light passage state or the light shielding state. Therefore, the liquid crystal panel apparatus 30 is usable as the shutter or the diaphragm when the liquid crystal panel 1G is positioned in front of or behind an optical system of an imager.

Third Embodiment

Imager According to Third Embodiment

An imager according to a third embodiment includes the optical system, the liquid crystal panel apparatus according to the second embodiment, and an imaging element that receives light that has passed through the optical system and the hole of the liquid crystal panel apparatus.

Figure 9:
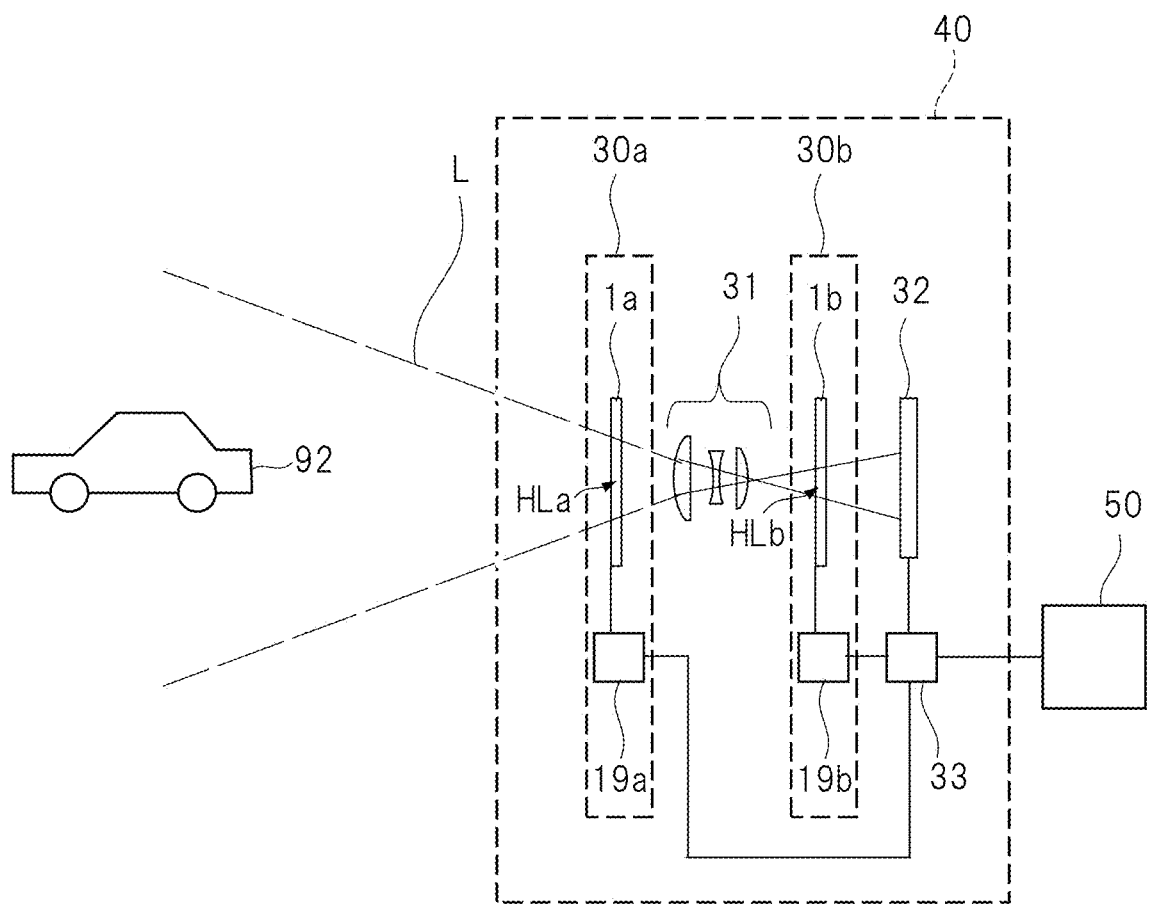
FIG. 9 is a diagram schematically illustrating an example of an imager according to a third embodiment.

FIG. 9 is a diagram schematically illustrating an example of the imager according to the third embodiment. An imager 40 illustrated in FIG. 9 includes liquid crystal panel apparatuses 30a and 30b, an optical system 31, an imaging element 32, and a general controller 33.

The liquid crystal panel apparatuses 30a and 30b each have a similar configuration to that of the liquid crystal panel apparatus according to the second embodiment. The liquid crystal panel apparatus 30a includes a liquid crystal panel 1a having a hole HLa and a controller 19a electrically connected to the liquid crystal panel 1a. The liquid crystal panel apparatus 30b includes a liquid crystal panel 1b having a hole HLb and a controller 19b electrically connected to the liquid crystal panel 1b. The liquid crystal panel 1a is arranged in front of the optical system 31, i.e., arranged on a target object 92 side. The liquid crystal panel 1b is arranged behind the optical system 31. The imaging element 32 is arranged further behind the liquid crystal panel 1b.

The general controller 33 is electrically connected to the controllers 19a and 19b and the imaging element 32. To the controllers 19a and 19b, the general controller 33 transmits a control signal for independently setting the respective regions corresponding to the holes HLa and HLb into the light passage state or the light shielding state. By transmitting the control signal, the general controller 33 makes the liquid crystal panel 1a functional as the shutter and makes the liquid crystal panel 1b functional as the shutter or the diaphragm. The general controller 33 receives an output signal of the imaging element 32.

That is, by controlling the liquid crystal panel apparatus 30a and the liquid crystal panel apparatus 30b, the general controller 33 captures an image of the target object 92, and acquires an image signal of the target object 92 obtained by the imaging from the imaging element 32. Note that the imaging to be performed is not limited to standard imaging, but may be special imaging such as coded imaging.

The general controller 33 is electrically connected to an external apparatus 50. The general controller 33 performs the imaging based on a command signal from the external apparatus 50, and generates image data based on the image signal obtained by the imaging and transmits the generated image data to the external apparatus 50. Note that the general controller 33 is made of, for example, an electronic circuit, a semiconductor circuit, a dedicated IC chip, a programmable IC chip, a micro controller, a computer or the like. The external apparatus 50 may be any apparatus if the apparatus handles the image data, such as a driving assist apparatus mounted on a vehicle such as an automobile.

In the imager 40 according to the third embodiment, the liquid crystal panel can be used as the shutter or the diaphragm.

In the foregoing, various embodiments and various examples of the present invention have been explained. However, the present invention is not limited to the foregoing embodiments, and include various modification examples. Also, the above-described embodiments have been explained for supporting the understandable explanation of the present invention, and are not always limited to the one including all structures explained above. Also, a part of the structure of one embodiment can be replaced with the structure of another embodiment, and besides, the structure of another embodiment can be added to the structure of one embodiment. All these elements belong to the scope of the present invention. Further, the numerical values included in the texts and the drawings and the like are also described as only one example, and the usage of the different values or the like does not lose the effects of the present invention.

What is claimed is:

1. A liquid crystal panel comprising:
  a first substrate allowing light to pass through;
  a second substrate arranged to face the first substrate and allowing light to pass through;
  a light shielding film formed on a surface of the second substrate, the surface close to the first substrate;
  a plurality of spacers arranged on a surface of the first substrate, the surface close to the second substrate, to be spaced apart from one another; and
  a liquid crystal sandwiched between the first substrate and the second substrate,
  wherein the light shielding film has a circular hole,
  the plurality of spacers are arranged to overlap the light shielding film in plan view,
  the second substrate has a hole region corresponding to the hole and a peripheral region surrounding the hole region,
  a substrate-to-substrate distance between the first substrate and the second substrate is held to become larger as coming closer to the hole, and
  the hole region has a shape protruding in a direction extending from the first substrate to the second substrate.

2. The liquid crystal panel according to claim 1,
  wherein the plurality of spacers include:
    a first spacer arranged in a first region relatively closer to the hole region and having a first length as a length in a direction perpendicular to the planar direction of the first substrate; and
    second a spacer arranged in a second region relatively farther from the hole region and having a second length smaller than the first length, as a length in the direction perpendicular to the planar direction of the first substrate.

3. The liquid crystal panel according to claim 1,
  wherein the plurality of spacers each have a columnar shape extending in a substrate-to-substrate direction that is a direction perpendicular to the planar direction of the first substrate,
  the plurality of spacers include:
    a first spacer arranged in a first region relatively closer to the hole region, having a first length as a length in the substrate-to-substrate direction, and having a first area ratio as an area ratio of a surface on the first substrate side in the substrate-to-substrate direction, and
    a second spacer arranged in a second region relatively farther from the hole region, having the first length as a length in the substrate-to-substrate direction, and having a second area ratio smaller than the first area ratio, as an area ratio of a surface on the first substrate side in the substrate-to-substrate direction.

4. The liquid crystal panel according to claim 1, further comprising
  an underlying film arranged between the first substrate and the plurality of spacers,
  wherein the plurality of spacers include:
    a first spacer arranged in a first region relatively closer to the hole region and having a first length as a length in a substrate-to-substrate direction that is a direction perpendicular to the planar direction of the first substrate; and a second spacer arranged in a second region relatively farther from the hole region and having the first length as a length in the substrate-to-substrate direction, a thickness of the underlying film at a position corresponding to the first spacer is a first thickness, and a thickness of the underlying film at a position corresponding to the second spacer is a second thickness smaller than the first thickness.

5. The liquid crystal panel according to claim 1, further comprising an underlying film arranged between the first substrate and the plurality of spacers, wherein the plurality of spacers include:

a first spacer arranged in a first region relatively closer to the hole region and having a first length as a length in a substrate-to-substrate direction that is a direction perpendicular to the planar direction of the first substrate; and a second spacer arranged in a second region relatively farther from the hole region and having a second length smaller than the first length, as a length in the substrate-to-substrate direction, a thickness of the underlying film at a position corresponding to the first spacer is a first thickness, and a thickness of the underlying film at a position corresponding to the second spacer is a second thickness smaller than the first thickness.

6. The liquid crystal panel according to claim 1, wherein the plurality of spacers include:

a first spacer arranged in a first region relatively closer to the hole region; and a third spacer arranged in a third region relatively farther from the hole region, and, in the second substrate, a second region positioned between the first region and the third region has a shape recessed in a direction extending from the second substrate to the first substrate.

7. The liquid crystal panel according to claim 1, further comprising a seal part formed to surround a columnar region of a region between the first substrate and the second substrate, the columnar region corresponding to the hole, wherein the liquid crystal is sealed into a cylinder formed by the seal part.

8. A liquid crystal panel apparatus comprising:

a first substrate allowing light to pass through;

a second substrate arranged to face the first substrate and allowing light to pass through;

a light shielding film formed on a surface of the second substrate, the surface close to the first substrate;

a plurality of spacers arranged on a surface of the first substrate, the surface close to the second substrate, to be spaced apart from one another;

a liquid crystal sandwiched between the first substrate and the second substrate; and a controller controlling a voltage applied to the liquid crystal, wherein the light shielding film has a circular hole, the plurality of spacers are arranged to overlap the light shielding film in plan view, the second substrate has a hole region corresponding to the hole and a peripheral region surrounding the hole region, a substrate-to-substrate distance between the first substrate and the second substrate is held to become larger as coming closer to the hole, the hole region has a shape protruding in a direction extending from the first substrate to the second substrate, and the controller sets the hole region to either a light passage state or a light shielding state by controlling the voltage.

9. An imager comprising:

a liquid crystal panel apparatus;

an optical system; and an imaging element, the liquid crystal panel apparatus including:

a first substrate allowing light to pass through;

a second substrate arranged to face the first substrate and allowing light to pass through;

a light shielding film formed on a surface of the second substrate, the surface close to the first substrate;

a plurality of spacers arranged on a surface of the first substrate, the surface close to the second substrate, to be spaced apart from one another;

a liquid crystal sandwiched between the first substrate and the second substrate; and a controller controlling a voltage applied to the liquid crystal, wherein the light shielding film has a circular hole, the plurality of spacers are arranged to overlap the light shielding film in plan view, the second substrate has a hole region corresponding to the hole and a peripheral region surrounding the hole region, a substrate-to-substrate distance between the first substrate and the second substrate is held to become larger as coming closer to the hole, the hole region has a shape protruding in a direction extending from the first substrate to the second substrate, the controller sets the hole region to either a light passage state or a light shielding state by controlling the voltage, and the imaging element receives light that has passed through the optical system and the hole of the liquid crystal panel apparatus.

* * * * *